Aug. 14, 1928.
J. W. BUTLER ET AL
1,680,762
DOUCHE AND SYRINGE
Filed May 11, 1927
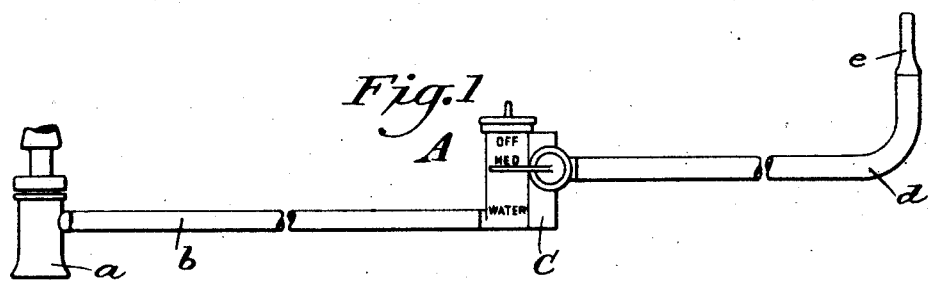
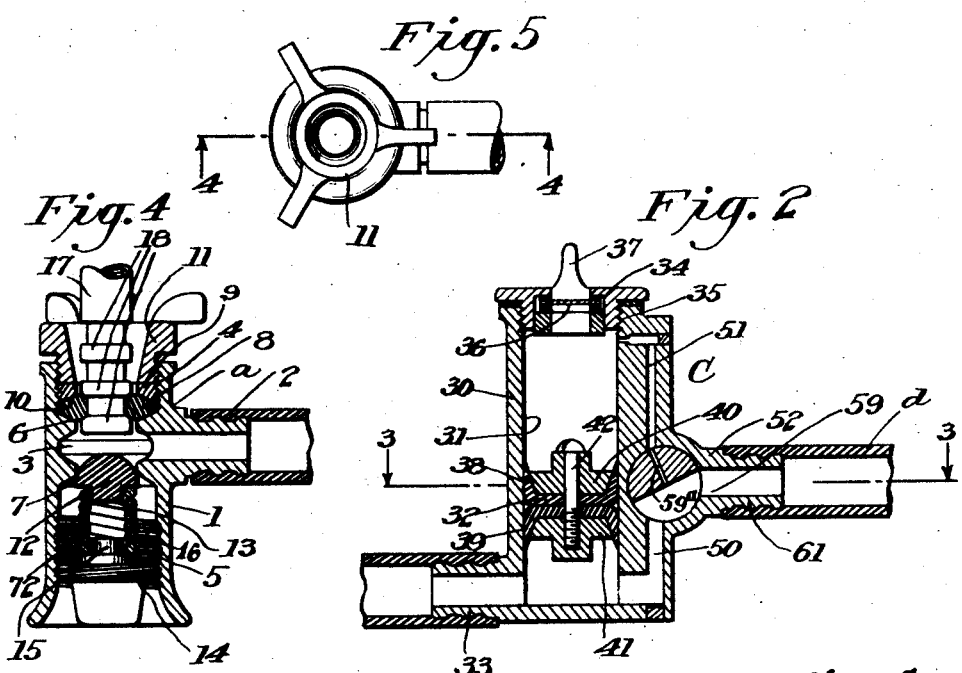
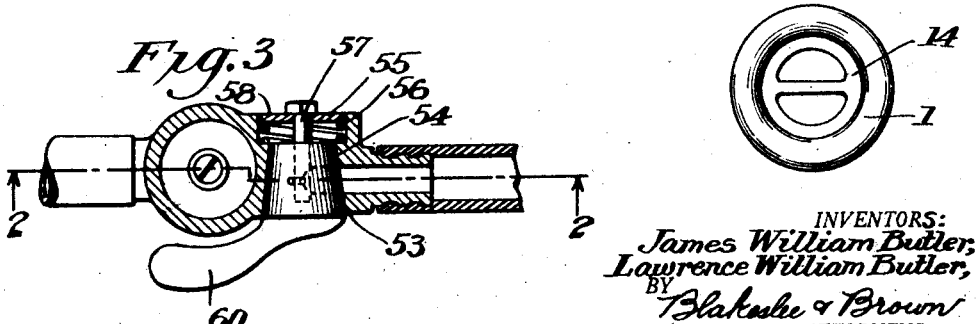
INVENTORS:
James William Butler,
Lawrence William Butler,
BY Blakeslee & Brown
ATTORNEYS.

Patented Aug. 14, 1928.

1,680,762

UNITED STATES PATENT OFFICE.

JAMES WILLIAM BUTLER AND LAWRENCE WILLIAM BUTLER, OF BURBANK, CALIFORNIA.

DOUCHE AND SYRINGE.

Application filed May 11, 1927. Serial No. 190,530.

This invention relates to douches and syringes. In particular the invention has to do with that type of douche which is so arranged as to have a part thereof hold a medicament, which medicament is mixed with some other liquid in proportion to a given quantity flow of said liquid.

Other objects include a douche of the general character stated, which is simple of construction, easy of operation and generally superior.

With the above and other objects in view, the invention consists in the novel and useful provision, formation, construction, association and relative arrangement of parts, members and features all as shown in a certain embodiment in accompanying drawing, described generally, and more particularly pointed out in the claims.

In the drawing:

Figure 1 is an elevation of the invention;

Figure 2 is a cross sectional view on the line 2—2 of Figure 3;

Figure 3 is a sectional view on the line 3—3 of Figure 2;

Figure 4 is a cross sectional view on the line 4—4 of Figure 5;

Fig. 5 is a plan view of certain elements of the invention; and

Figure 6 is a plan view of certain elements of the invention, looking in the direction of the bottom arrow of Figure 4.

Corresponding parts in all figures are designated by the same reference characters.

Referring now to the particularity to the drawing, the improved douche as an entirety is designated by A, of which $a$, $b$, $c$, $d$, and $e$ are parts thereof, all of which parts may be used in practicing one embodiment of the invention shown.

The part $a$ is shown in Figure 4 and the part $c$ in Figures 2 and 3.

Referring first to Figure 4, said part $a$ includes a housing 1, formed with an outstanding nipple 2, permitting communication with the interior of the housing as shown at 3. This housing is internally screw threaded as shown at 4 and 5, and the interior of the housing is formed with two seat portions 6 and 7. Adapted to be received on the seat portion 6 is an annular washer 8, against which bears a compression ring 9. Said compression ring being formed with a tapered seat 10, where it engages the washer 8. An annular wing nut 11 is screwthreaded to the threads 4 and bears against the compression ring 9.

A valve 12 is adapted to seat against the said portion 7 when in one position. Said valve is formed with a stud 13. Adjusting screw 14 is screwthreaded to the threads 5 and said adjusting screw carries a stud 15. A coil spring 16 is interposed between the valve 12 and the adjusting screw, being held in position by the studs 13 and 15 respectively. Quite obviously a turning of the adjusting screw will regulate the compression of the spring and in turn the valve will be regulated as to the amount of pressure necessary to unseat it. The part $a$ is adapted to be connected to a spigot 17 and in the present instance this spigot comprises a nozzle formed with spaced peripheral ribs 18. Upon loosening the wing nut so that the washer 9 is out of binding engagement with the gasket, the said spigot may be received within the annular opening of said nut and likewise received within the space 3. Upon tightening the wing nut, the gasket 8 is compressed inwardly so as to tightly bind the spigot as illustrated in Figure 4.

The part $c$ is best illustrated in Figures 2 and 3. This part is adapted to hold a fluid medicament of some form. Part 3 includes a casing 30 formed with a curved chamber or cylinder 31 within which is a double acting or floating piston 32. Said casing is provided with a nipple 33 communicating directly with one end of said chamber 31. A cap 34, formed with screw threads 35, is adapted to close one end of the said chamber and said cap is provided with a transparent portion 36 so that any content within the chamber 31 may be viewed. A lug, or the like, 37 is provided for the said cap so that the said cap may be readily secured to the casing. The piston is conventional in form including two cup shaped discs held in cooperating relation through the medium of rings 40 and 41. A screw 42 is passed centrally through one of the said rings for screw threaded engagement with the other of said rings. A by pass opening 50 communicates with the lower end of the chamber or cylinder 31, and a second by-pass opening 51, communicates with the upper end of said chamber or cylinder.

The casing is enlarged at 52 and formed with a transverse tapered bore 53, this tapered bore being in direct communication with the by pass openings 50 and 51. A valve, constituting a tapered plug 54, is received within the tapered opening 53, and retained in position therein by means 55. Said means 55 including a coil spring 56, bolt 57, and a disc 58. The bolt 57 is received within the said plug and the spring 56 is received within a socket surrounding the tapered seat of the valve, bearing against a portion of said socket wall and against the disc 58, which disc is in part confined within the said socket.

In this manner the plug is resiliently held within the tapered seat. This plug is provided with a segmental groove port or slot 59 and a radial port 59ª extends between the periphery of said plug and said groove or slot 59. The said plug is provided with a handle 60 whereby the plug may be rotated. A nipple 61 extends outwardly from the enlargement 52 and is in direct communication with the valve. A hose of some kind interconnects the parts a and c being connected to the nipples 2 and 33 of said members and a further hose d is received in part upon the nipple 61. The opposite end of the hose d is adapted to receive an attachment or appliance of some form as shown at e.

The operation, use and advantages of the device just described are as follows:

Assuming that the part a has been associated with a spigot of some form such as shown at 17 in Figure 4, and the valve 12 is held seated by adjusting the member 14 which acts as a pressure adjusting member, and further assuming that the piston 32 is in the position shown in Figure 2, or perhaps at its lowermost position with the cylinder, with the cylinder filled with a liquid medicament of some form above said piston, upon causing water or other liquid to flow through the spigot 17 said liquid will be directed through the tube b and into the chamber 31, beneath the piston 32. If the valve plug 54 is turned to the position as indicated in Figures 1 and 2, the fluid will be directed through the by-pass 50, the groove or port in the valve plug 59 and in turn into the tube d. While this is occurring, the piston 32 will be forced upwardly within the cylinder due to pressure behind the same, which will force the liquid medicament into the by-pass 51 and through the port 60 of the valve plug where it will mix with the liquid being passed through the port or groove 59 of the valve. It will be noted that the by pass ports 50 and 51 differ as to cross sectional area and for this reason there will be a difference of liquid pressure. The restrictions of the size of these ports is sufficient to cause a back pressure of the liquid entering the lowermost portion of the chamber and behind the piston to move the piston. Upon turning the valve plug to a second position indicated by the word "water" in Figure 1, the plug will be turned sufficiently so that the port 60 will be out of communication with the by pass port 61 and as a consequence water or other liquid will be passed outwardly through the tube d. If the plug is turned to an off position, the plug will then be rotated so that the port 60 is out of communication with the by pass 61, and the cut-away portion 59 closes communication through the nipple 61. This will, of course, build up a back pressure in the tube b and this back pressure will cause an unseating of the valve 12 to allow liquid to pass outwardly through ports in member 14. In fact any back pressure occurring at any time, regardless of the position of the plug, when it reaches a certain pressure will unseat the plug 12. Preferably the valve 12 will unseat, when the back pressure reaches a point sufficient to burst the tube b.

The device can be regulated by regulating the size of the port opening and by pass openings 50, 51 and 60, so that varying quantities of liquid may be treated with medicament.

It is obvious that various changes, modifications and variations may be made in practicing the invention, in departure from the particular showing of the drawing without departing from the true spirit thereof.

Having thus disclosed our invention, what we claim and desire to obtain Letters Patent on is—

1. In a device of the character disclosed, means of attachment with a source of liquid supply, means adapted to hold a medicated liquid, means of communication between the first and second named means whereby liquid received in the first named means is directed to the second named means, and movable means in said second named means adapted to be acted upon by the liquid from the source of liquid supply to thereby cause flow of any medicated liquid within said second named means.

2. In a device of the character disclosed, means of attachment with a source of liquid supply, means adapted to hold a medicated liquid, means of communication between the first and second named means whereby liquid received in the first named means is directed to the second named means, and movable means in said second named means adapted to be acted upon by the liquid from the source of liquid supply thereby to cause flow of any medicated liquid within said second named means, and means for controlling the passage of said medicated liquid.

3. Improvements in douches and syringes, a casing formed with a cylinder portion, a floating piston in said cylinder portion, said casing being formed with separate by-passes in communication with the top and bottom of the cylinder, a valve in communication with said by-passes, the valve being adapted to permit communication between the by-passes or to close communication therebetween, said casing being formed with an inlet portion to said cylinder, and with an outlet portion communicating with the valve, and means of communication with the source of liquid supply and said inlet portion.

4. Improvements in douches and syringes, a casing formed with a cylinder portion, a floating piston in said cylinder portion, said casing being formed with separate by-passes in communication with the top and bottom of the cylinder, a valve in communication with said by-passes, the valve being adapted to permit communication between the by-passes or to close communication therebetween, said casing being formed with an inlet portion to said cylinder, and with an outlet portion communicating with the valve, and means of communication with the source of liquid supply and said inlet portion, said means of communication including a casing formed for engagement with a nozzle, and pressure release means in said casing whereby any back pressure within said casing will operate said pressure release means.

In testimony whereof, we have signed our names to this specification.

JAMES WILLIAM BUTLER.
LAWRENCE WILLIAM BUTLER.